United States Patent

[11] 3,634,821

[72] Inventors Douglas C. Bossen
Wappingers Falls;
Mu-Yue Hsiao, Poughkeepsie, both of N.Y.

[21] Appl. No. 27,602
[22] Filed Apr. 13, 1970
[45] Patented Jan. 11, 1972
[73] Assignee International Business Machines Corporation
Armonk, N.Y.

[54] ERROR CORRECTING SYSTEM
5 Claims, 10 Drawing Figs.

[52] U.S. Cl. .......... 340/146.1
[51] Int. Cl. .......... G08c 25/00, G06f 11/00
[50] Field of Search .......... 340/146.1; 178/23.1; 325/41; 235/153

[56] References Cited

UNITED STATES PATENTS 3,404,373 10/1968 Srinivasan .......... 340/146.1
3,478,313 11/1969 Srinivasan .......... 340/146.1
3,504,340 3/1970 Allen .......... 340/146.1

*Primary Examiner*—Charles E. Atkinson
*Attorneys*—Hanifin and Jancin and Harold H. Sweeney, Jr.

ABSTRACT: A multiple error correcting system for correcting $t$ ($t$ 2) errors in message of $k$ data bits, $m^2$ $k$ $(m+1)^2$, where $m$ is an integer of at least three, comprises encoding means and decoding means. The encoding means adds $r$ check bits, each check bit corresponding to a number of data bits; each data bit is represented by $2t$ check bits; these $2t$ check bits have only the one data bit in common; and, the number, $r$, of check bits is: $2mt$ $r$ $2(m+1)t$. The decoding means for each data bit has an error correcting circuit receiving $2t+1$ inputs from input circuitry, the inputs being the data bit itself, and $2t$ combinations of check bits and other data bits representing the data bit. The error correcting circuit is capable of producing an output signal correctly corresponding to a data bit if no more than $t$ inputs thereto for that data bit were in error. A coding system for generating these $r$ check bits by augmenting Latin square codes is described.

$L_1$

| | | | | |
|---|---|---|---|---|
| 0 | 1 | 2 | 3 | 4 |
| 1 | 2 | 3 | 4 | 0 |
| 2 | 3 | 4 | 0 | 1 |
| 3 | 4 | 0 | 1 | 2 |
| 4 | 0 | 1 | 2 | 3 |

$L_2$

| | | | | |
|---|---|---|---|---|
| 0 | 1 | 2 | 3 | 4 |
| 2 | 3 | 4 | 0 | 1 |
| 4 | 0 | 1 | 2 | 3 |
| 1 | 2 | 3 | 4 | 0 |
| 3 | 4 | 0 | 1 | 2 |

$L_3$

| | | | | |
|---|---|---|---|---|
| 0 | 1 | 2 | 3 | 4 |
| 3 | 4 | 0 | 1 | 2 |
| 1 | 2 | 3 | 4 | 0 |
| 4 | 0 | 1 | 2 | 3 |
| 2 | 3 | 4 | 0 | 1 |

$L_4$

| | | | | |
|---|---|---|---|---|
| 0 | 1 | 2 | 3 | 4 |
| 4 | 0 | 1 | 2 | 3 |
| 3 | 4 | 0 | 1 | 2 |
| 2 | 3 | 4 | 0 | 1 |
| 1 | 2 | 3 | 4 | 0 |

ERROR CORRECTING SYSTEM

This invention relates to error correction in systems for handling (e.g., transmitting, processing, storing) information in the form of messages of data bits, particularly multiple error correction systems useful in parallel data handling systems such as high-speed computer memories, data paths and other paths requiring a high degree of protection against the introduction of errors.

Coding systems for correcting errors, in general, utilize the addition, to the data bits of the message, of a number of check bits, producing a coded message which can be decoded in such a way as to correct errors introduced during storage or transmission of the message. Early coding systems, known as Hamming codes, first set forth in U.S. Pat. No. Re 23,601, although utilizing a minimum number of check bits, nonetheless are slow and difficult to decode (requiring, e.g., sequential detection and correction of the same error), involving complicated and error-prone circuitry.

In majority-vote decodable coding systems, each check bit corresponds to an equation having several data bits, and all check bit equations are independent—i.e., any two check bit equations have no more than one data bit in common. For example, where only a single error is to be corrected, two check bits are dependent on each data bit, and these two check bits, along with the data bit itself, provide three data bit positions or votes. Utilizing a majority voting type of decoding system, if an error occurs in only one of these three positions, then the correct value can be recognized from the other two positions. For multiple error correction, in general, if $t$ is the number of errors to be corrected ($t \geq 2$), then $2t+1$ positions must be provided for each data bit. Errors occurring in $t$ or fewer positions can then be corrected by accepting the majority value which is correct.

Previous majority voting correction codes, particularly for multiple error correction, have been based on Latin squares. In general, $k$ data bits are arranged into a Latin square of side $m$, where $k \leq m^2$, a Latin square of side $m$ being an arrangement of $m$ digits into $m^2$ subsquares of a square in such a way that every row and every column contains every digit exactly once. Two sets of independent check bits can be generated from the Latin squares thereby, one set being check bits corresponding to each row and the other set being check bits corresponding to each column. Additional sets of check bit equations can be generated in accordance with orthogonal Latin square theory, the number of equations thus possible to be generated limiting the error-correcting capabilities of the code.

The resultant check bit equations must have the property that each data bit appears in exactly $2t$ check bit equations, and these $2t$ equations containing a common data bit contain no other common data bit.

However, the minimum number of check bits required by the Latin square approach for $k$ data bits is subject to the requirement that $k \leq m^2$, where the total number of check bits, $r$, will $= 2mt$. Where $k$ is not a perfect square, it is necessary to utilize the next highest Latin square to generate the check bit equations. Thus, for example, in the conventional Latin square approach, for double error correction ($t=2$), for $k=25$, $m=5$ and $2mt=20$ check bits. But, for $k=26$, it is necessary to go to $m=6$, so that $2mt=24$, an addition of four check bits to accommodate only one additional data bit.

It is therefore an object of this invention to provide more efficient majority-vote decodeable coding system in which the ratio of data bits to check bits, $k/r$, where $k$ is not a perfect square, is increased over that obtained in conventional Latin square coding systems.

Another object is to provide ways of expanding, and thereby improving the efficiency of conventional Latin square codes.

The invention features, in a system for handling information in the form of messages of data bits, a multiple error correcting system for correcting $t$ errors in messages of a number of data bits $k$, where $t$ 2, $m^2<k<(m+1)^2$, and $m$ is an integer of at least 3, comprising encoding means for adding $r$ check bits to the data bits, each check bit corresponding to a number of data bits, each data bit being represented by $2t$ check bits, these $2t$ check bits having only said one data bit in common, and the number, $r$, of check bits being such that $2mt \leq r < 2(m+1)t$; and, decoding means including an error correcting circuit and input circuitry for said error correcting circuit, the input circuitry transmitting $2t+1$ inputs to the error correcting circuit for each data bit, the inputs for each data bit being the data bit itself and $2t$ combinations of check bits and other data bits representing the data bit, and the error correcting circuit being capable of producing an output signal correctly corresponding to a data bit where no more than $t$ inputs for that data bit are in error.

In preferred embodiments, the error correcting circuit comprises a threshold logic circuit for each of the data bits with this threshold fixed to produce an output signal of a value corresponding to that of the majority of inputs to the threshold logic circuit, and the input circuitry comprises $2t$ EXCLUSIVE OR circuits for each data bit, each having inputs consisting of at least $m$, and, on the average, greater than $m$ data bits and one of the check bits.

In a preferred system, the encoding means includes circuitry for producing $2mt$ of the $r$ check bits in accordance with an arrangement of $m^2$ of the $k$ data bits, designated $d_0, d_1 \ldots d_m$ 1, in a basic square array. At least some data bits of $2m$ of these $r$ check bits are the data bits of each row and each column of that square array, and at least some data bits of $2(m-1)t$ of said check bits are data bits which correspond in position in said basic square array of data to the position of digits which are the same in each of a pair of orthogonal squares for each $t$. The encoding means further includes circuitry for adding to at least some of said $2mt$ check bits $k-m^2$ data bits, designated $d_m \ldots d_{k-1}$, each of said data bits being added to at least $2t-1$ and at most $2t$ of said check bits, and all of said check bits having only said added data bit in common. The encoding means may also further include circuitry for producing $r-2mt$ additional check bits ($r>2mt$), all of which correspond only to data bits $d_m \ldots d_{k-1}$.

Other objects, features, and advantages will be apparent from the following description of a preferred embodiment of the present invention taken together with the attached drawings thereof in which:

FIG. 1 is a block diagram of a data processing system including an error correcting system;

FIGS. 2 and 2*a* are schematic diagrams of the general encoder form for deriving the necessary check bits;

Figures 4, 5, 5A:
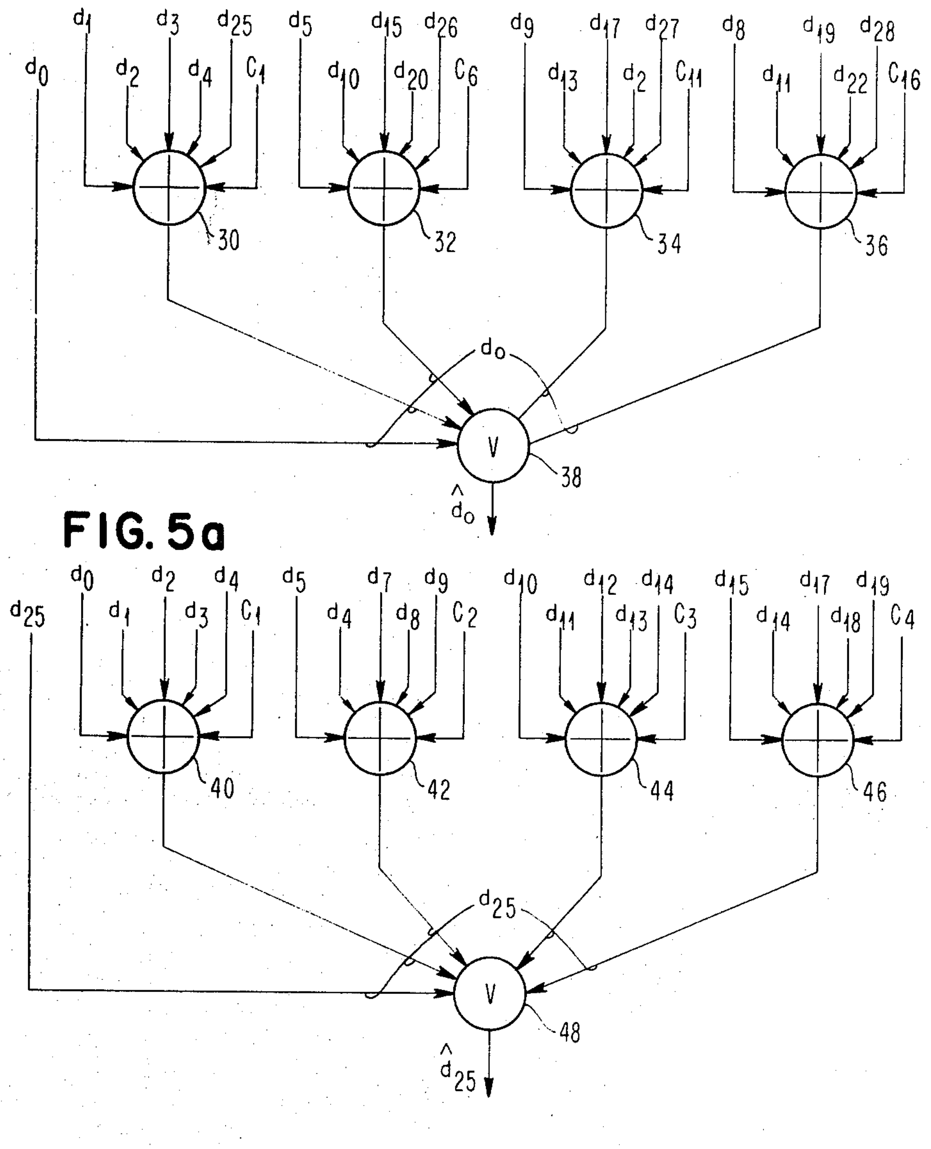
FIG. 4 is the set of four orthogonal Latin squares for five digits.
Figure 6:
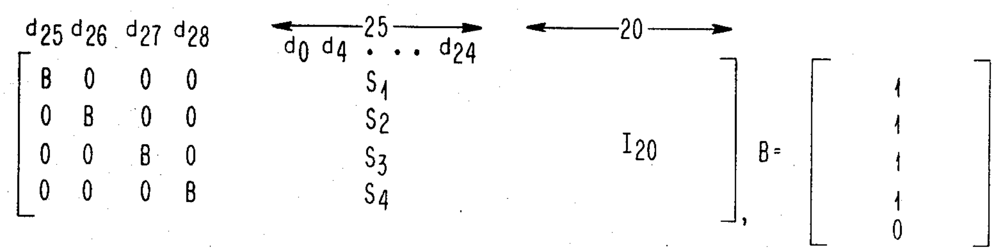
Figure 7:
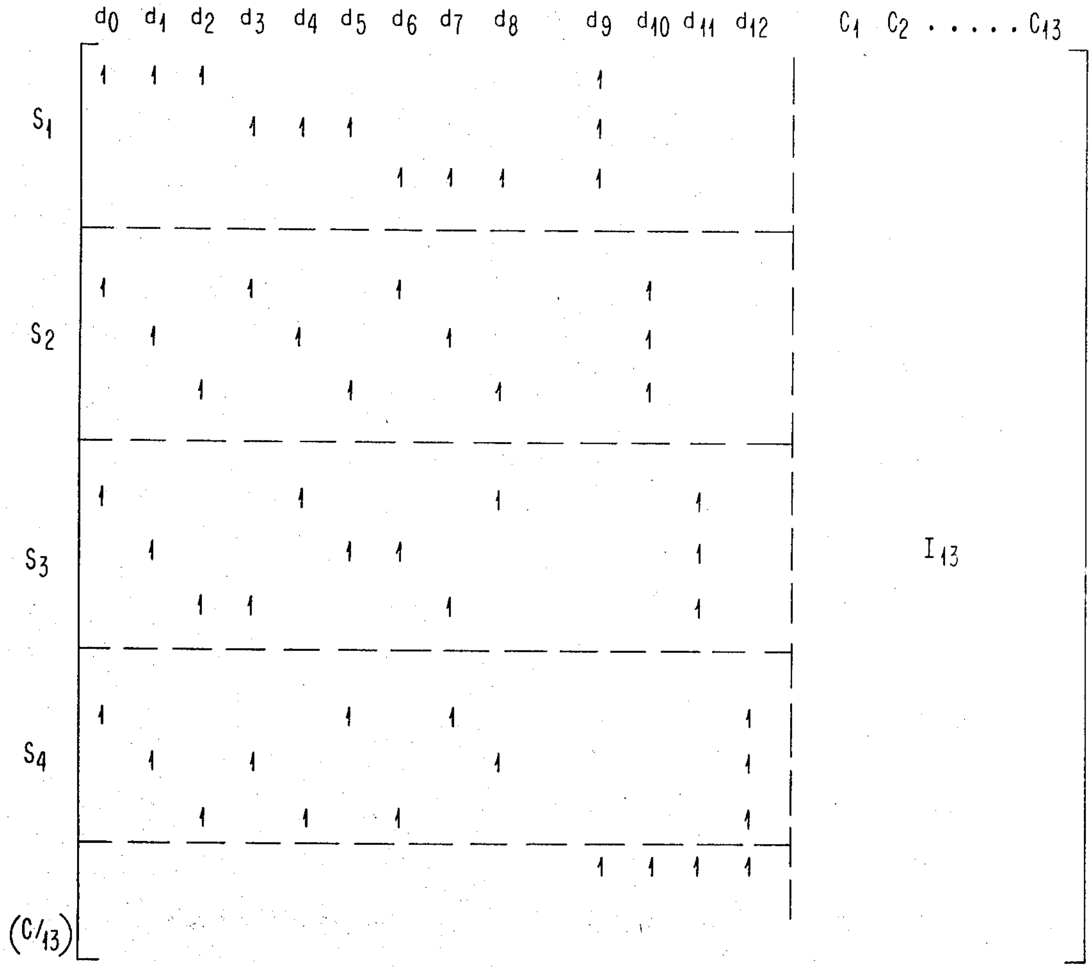
Figure 8:
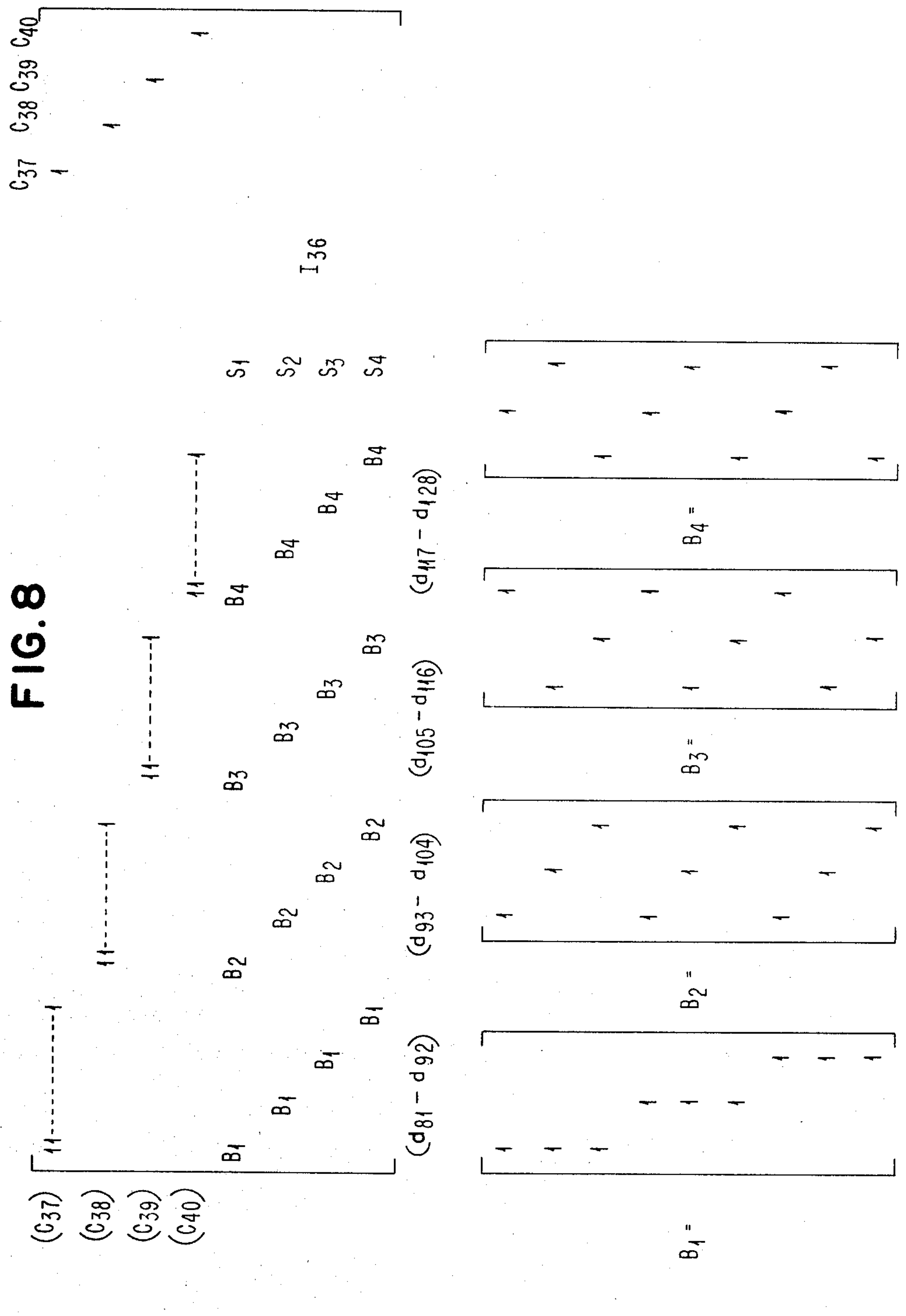

FIGS. 5 and 5*a* are schematic diagrams of decoders for the $d_0$ and $d_{25}$ data bit capable of correcting two errors; and, FIGS. 6, 7 and 8 are illustrative augmented Latin square matrixes.

Figures 1, 2, 2A, 3:
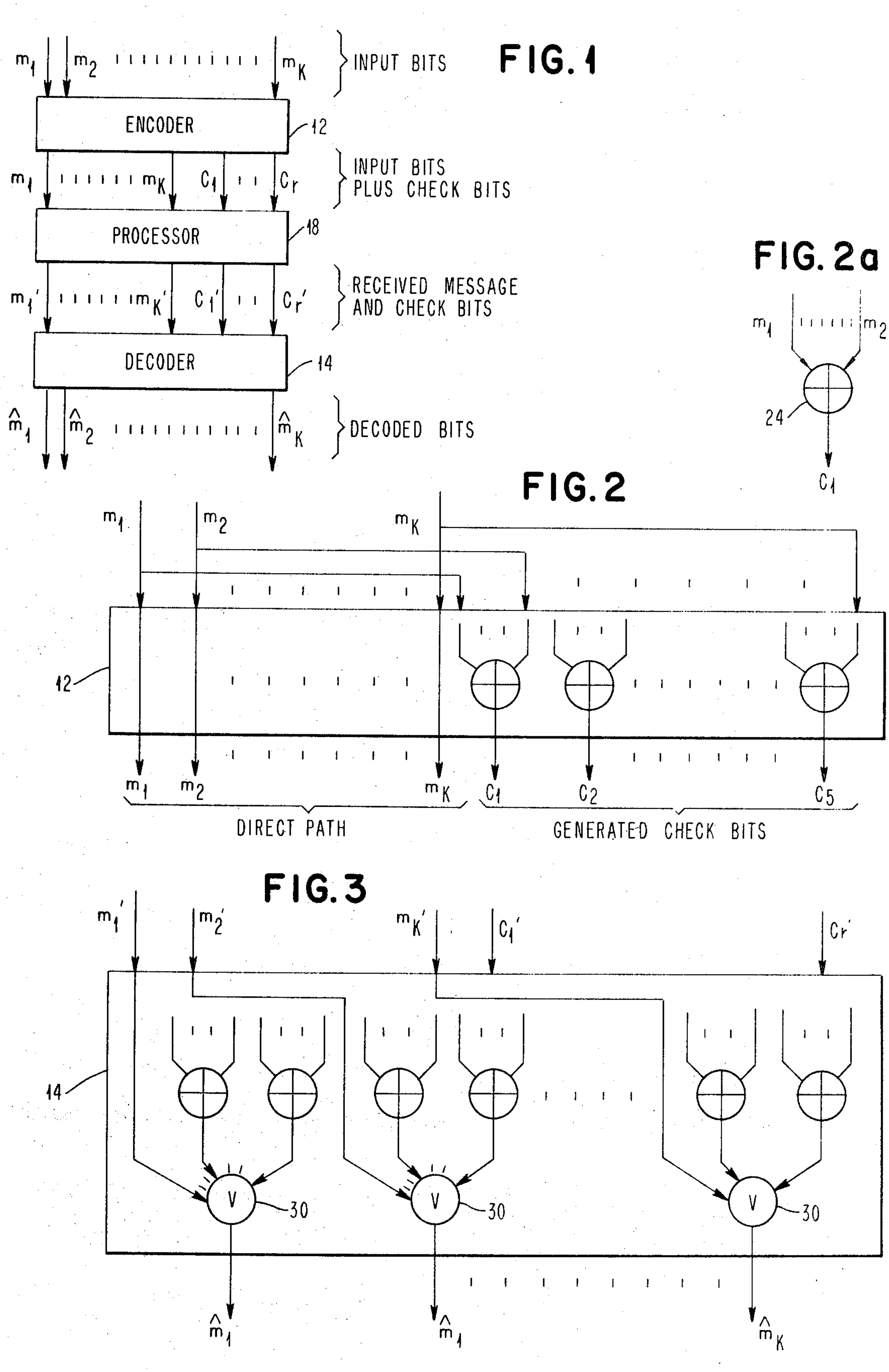
FIG. 3 is a schematic diagram of the general decoder form for the encoded messages from FIG. 2.

FIG. 1 shows an encoder 12 receiving $k$ data bits, $m_1$, $m^2 \ldots m_{ka8}$ and having an output of $k$ data bits plus $r$ check bits, $c_1, c_2 \ldots c_r$. A typical encoder is shown in FIG. 2, each check bit $m$ being passed both in a direct path and in a check bit generating path, where it is encoded in exactly two emerging check bits. As shown in FIG. 2*a*, each data bit may be fed, along with other data bits, in accordance with the coding system, to an EXCLUSIVE OR circuit, the output of which will be the corresponding check bit. Thus, in FIG. 2*a*, data bits such as $m_1$, $m_2$,...are fed to EXCLUSIVE OR-circuit 24 to produce a check bit $c_1$. As shown in FIG. 1, the data bits and check bits are then handled in processor 18.

The information may then, when desired, be decoded in decoder 14. As shown in FIG. 3, the decoder consists of a number of majority voting circuits 30, i.e., a threshold logic circuit which produces an output signal representative of the data bit if the majority of data bit and check bit inputs thereto are correct. For a data bit $m_1$, the formula for its two check bits, $c_1$, $c_2$ might be:

$$c_1 = m_1 \oplus \ldots \oplus m_2$$
$$c_2 = m_1 \oplus \ldots \oplus m_3$$

where $c_1$ and $c_2$ have only $m_1$ as a common data bit, and the symbol ⊕ represents an EXCLUSIVE OR function. These two formulas can also be written:

$$m_1 = c_1 \oplus \ldots \oplus m_2,$$
$$m_1 = c_2 \oplus \ldots \oplus m_3.$$

Since no common variable remains in these formulas, the presence of a single error in any of the data or check bits forming these equations affects at most one formula. Thus, $m_1$ will be given by:

$$\hat{m}_1 = \text{Maj.}(m_1, c_1 \oplus \ldots \oplus m_2, c_2 \oplus \ldots \oplus m_3).$$

A preferred method for producing codes within the present invention is augmentation of Latin square codes.

In general, a Latin square of side $m$ is an arrangement of $m$ digits into a square array such as shown below. For $k=m^2$, the $m^2$ data bits represented by the symbols $d_0, d_1, \ldots d_{k-1}$ are arranged in a square array of the following form:

| | $c_{m+1}$ | $c_{m+2}$ | $c_{m+3}$ . . . | $c_{2m}$ | |
|---|---|---|---|---|---|
| $c_1$ | $d_0$ | $d_1$ | $d_2$ . . . | $d_{m-1}$ | |
| $c_2$ | $d_m$ | $d_{m+1}$ | $d_{m+2}$ . . . | $d_{2m-1}$ | |
| $c_3$ | $d_{2m}$ | $d_{2m+1}$ | $d_{2m+2}$ . . . | $d_{3m-1}$ | (1) |
| . | . | . | . | . | |
| $c_m$ | $d_{(m-1)m}$ | $d_{(m-1)m+1}$ | $d_{(m-1)m+2}$ . . . | $d_{m2-1}$ | |

The rows of this array are consecutively labeled with $c_1, c_2, \ldots c_m$ and the columns with $c_{m+1}, c_{m+2}, \ldots c_{2m}$. Thus, the equation for check bit $c_i$ ($i$ equal to 1, 2,...2$m$) is equal to the EXCLUSIVE OR function of the data bits which appear in its row and likewise with respect to the columns in the array. That is:

$$
\left.\begin{array}{llllll}
c_1 & = d_0 & \oplus\ d_1 & \oplus d_2 & \oplus \ldots & \oplus d_{m-1} \\
c_2 & = d_m & \oplus\ d_{m+1} & \oplus d_{m+2} & \oplus \ldots & \oplus d_{m-1} \\
\vdots & \vdots & \vdots & \vdots & \vdots & \vdots \\
c_m & = d_{(m-)m} & \oplus\ d_{(m-1)m+2} & \oplus d_{(m-1)m+2} & \oplus \ldots & \oplus d_{m2-1}
\end{array}\right\} \text{Row equations.}
$$

$$
\left.\begin{array}{llllll}
c_{m+1} & = d_0 & \oplus\ d_m & \oplus d_{2m} & \oplus \ldots & \oplus d_{(m-1)m} \\
c_{m+2} & = d_1 & \oplus\ d_{m-1} & \oplus d_{2m+1} & \oplus \ldots & \oplus d_{(m-1)m+1} \\
\vdots & \vdots & \vdots & \vdots & \vdots & \vdots \\
c_{2m} & = d_{m-1} & \oplus\ d_{2m-1} & \oplus d_{3m-1} & \oplus \ldots & \oplus d_{m2-1}
\end{array}\right\} \text{Column equations.}
$$

It can be seen that each data bit appears in exactly two of these $2m$ check bit equations. Also, any two equations contain only one data bit in common. The set of row check bit equations for $c_1 \ldots c_m$ shall be designated $S_1$, and the set of column check bit equations for $c_{m+1} \ldots c_{2m}$ shall be designated $S_2$.

To generate other sets, $S_3, S_4, \ldots$ of check bit equations, use is made of orthogonal Latin squares. The theory of orthogonal Latin squares is well known. For example, see C. B. Mann, "Analysis and Design of Experiments," Dover Publications, Inc., New York, 1949. There are limits on the maximum number of orthogonal Latin Squares of a given order (size). This is a function of $m$, the size of the Latin square. In general, an orthogonal Latin square of order (size) $m$ is an $m$X$m$ square array of the digits 0, 1,...,$m-1$ such that each row and each column are a permutation of the digits 0, 1,...,$m-1$. A Latin square is used to generate the set of $m$ check bit equations by superimposing the Latin square on the $m$X$m$ array of information bits given in equation [1]. This can be considered as a mask on the data bits. The data bits which are "covered" by the same digits in the Latin square are EXCLUSIVE OR'ed together to produce the check bit equation. This yields $m$ check bit equations. If $L_1$ and $L_2$ shown in FIG. 4 are orthogonal Latin squares, then the set of $2m$ check bit equations produced in the above manner from $L_1$ and $L_2$ will have the same property as the row and column equations for the single error correction case. This property is that any two equations containing a common data bit contain no other common data bit, and, therefore, can be added to the row and column equations for the single error correction case.

Thus, each data bit appears in four check bit equations, and no other common data bit appears in these four equations.

To understand the decoding process we notice that the equations $c_1$ and $c_{m+1}$ for example, can be rewritten as:

$$d_0 = c_1 \oplus d_1 \oplus d_2 \oplus \ldots \oplus d_{m-1}$$
$$d_0 = c_{m+1} \oplus d_m \oplus d_{2m} \oplus \ldots \oplus d_{(m-1)m}$$

The additional equations containing check bits derived from orthogonal Latin squares may be similarly rewritten. Since no common data bit or check bit remains in these two equations for $d_0$, the presence of a single error in the data or check bits $d_0, d_1, \ldots, d_{k-1}, c_1, c_2, \ldots c_{4m}$ can affect at most two of these four equations. Therefore, $d_0$ is correctly given by the function: $\hat{d}_0 = {}_{Maj}(d_0, c_1 \oplus d_1 \oplus d_2 \oplus \ldots \oplus d_{m-1}, c_{m+1} \oplus d_{2m} \oplus \ldots \oplus d_{(m-1)m}$, $S_3$ equation, $S_4$ equation). The equation for $\hat{d}_0$ is the majority voting equation for the majority voting decoding of the data bit $d_0$. A similar determination can be made for each data bit which was encoded.

To augment these Latin square codes, there is added to each set, S, of check bit equations, $\phi$ data bits (or $2t\phi$ data bits to the entire message) without adding check bits or by adding fewer check bits than would be required to go to the next higher Latin square. Since all equations within each set are independent of one another, and since no equation of any set is combined (for error correction) with another equation of that set in the conventional Latin square system, the same data bit may be added to more than one equation of a single set without destroying the independence of those equations with respect to their original data bits.

The value $\phi$ is a function of $t$ and of $m$, and is best understood from specific examples.

As a first example, consider a square code of $5^2=25$ data bits, where $t=2$. Thus, $m=5$ and there are four orthogonal Latin squares of order 5 as shown in FIG. 4. The number, $r$, of check bits is equal to $2mt$, where $t$ equals the number of errors to be corrected; so, $r=20$. The data bits $d_0$ through $d_{24}$, as previously set forth, are arranged in a square array as follows:

| | $c_6$ | $c_7$ | $c_8$ | $c_9$ | $c_{10}$ |
|---|---|---|---|---|---|
| $c_1$ | $d_0$ | $d_1$ | $d_2$ | $d_3$ | $d_4$ |
| $c_2$ | $d_5$ | $d_6$ | $d_7$ | $d_8$ | $d_9$ |
| $c_3$ | $d_{10}$ | $d_{11}$ | $d_{12}$ | $d_{13}$ | $d_{14}$ |
| $c_4$ | $d_{15}$ | $d_{16}$ | $d_{17}$ | $d_{18}$ | $d_{19}$ |
| $c_5$ | $d_{20}$ | $d_{21}$ | $d_{22}$ | $d_{23}$ | $d_{24}$ |

Sets $S_1$ and $S_2$ of check bit equations are obtained by EXCLUSIVE ORing together the data in rows $c_1$ to $c_5$ and columns $c_6$ and $c_{10}$, respectively. Sets $S_3$ and $S_4$ are derived from the Latin squares $L_1$ and $L_2$ which are shown in FIG. 4. These Latin squares $L_1$ and $L_2$ are theoretically used as overlays on the original square array of the 25 digits. The data bits corresponding to the same digits on the Latin square overlay are EXCLUSIVE OR'ed to form check bits $c_{11}$–$c_{20}$. The sets $S_1$–$S_4$ are as follows:

$$
\begin{array}{ll}
 & c_1 = d_0 \oplus d_1 \oplus d_2 \oplus d_3 \oplus d_4 \\
 & c_2 = d_5 \oplus d_6 \oplus d_7 \oplus d_8 \oplus d_9 \\
S_1 = & c_3 = d_{10} \oplus d_{11} \oplus d_{12} \oplus d_{13} \oplus d_{14} \\
 & c_4 = d_{15} \oplus d_{16} \oplus d_{17} \oplus d_{18} \oplus d_{19} \\
 & c_5 = d_{20} \oplus d_{21} \oplus d_{22} \oplus d_{23} \oplus d_{24}
\end{array}
$$

$$
\begin{array}{ll}
 & c_6 = d_0 \oplus d_5 \oplus d_{10} \oplus d_{15} \oplus d_{20} \\
 & c_7 = d_1 \oplus d_6 \oplus d_{11} \oplus d_{16} \oplus d_{21} \\
S_2 = & c_8 = d_2 \oplus d_7 \oplus d_{12} \oplus d_{17} \oplus d_{22} \\
 & c_9 = d_3 \oplus d_8 \oplus d_{13} \oplus d_{18} \oplus d_{23} \\
 & c_{10} = d_4 \oplus d_9 \oplus d_{14} \oplus d_{19} \oplus d_{24}
\end{array}
$$

$$
\begin{array}{ll}
 & c_{11} = d_0 \oplus d_9 \oplus d_{13} \oplus d_{17} \oplus d_{21} \\
 & c_{12} = d_1 \oplus d_5 \oplus d_{14} \oplus d_{18} \oplus d_{22} \\
S_3 = & c_{13} = d_2 \oplus d_6 \oplus d_{10} \oplus d_{19} \oplus d_{23}
\end{array}
$$

$$c_{14}=d_3\oplus d_7\oplus d_{11}\oplus d_{15}\oplus d_{24}$$
$$c_{15}=d_4\oplus d_8\oplus d_{12}\oplus d_{16}\oplus d_{20}$$

$$c_{16}=d_0\oplus d_8\oplus d_{11}\oplus d_{19}\oplus d_{22}$$
$$c_{17}=d_1\oplus d_9\oplus d_{12}\oplus d_{15}\oplus d_{23}$$
$$S_4=c_{18}=d_2\oplus d_5\oplus d_{13}\oplus d_{16}\oplus d_{24}$$
$$c_{19}=d_3\oplus d_6\oplus d_{14}\oplus d_{17}\oplus d_{20}$$
$$c_{20}=d_4\oplus d_7\oplus d_{10}\oplus d_{18}\oplus d_{21}$$

Since equations $c_1$–$c_5$ are all independent of one another, there may be added a data bit, $d_{25}$, to $2t$ of these equations, so that:

$$c_1=d_0\oplus d_1\oplus d_2\oplus d_3\oplus d_4\oplus d_{25}$$
$$c_2=d_5\oplus d_6\oplus d_7\oplus d_8\oplus d_9\oplus d_{25}$$
$$S_1=c_3=d_{10}\oplus d_{11}\oplus d_{12}\oplus d_{13}\oplus d_{14}\oplus d_{25}$$
$$c_4=d_{15}\oplus d_{16}\oplus d_{17}\oplus d_{18}\oplus d_{19}\oplus d_{25}$$
$$c_5=d_{20}\oplus d_{21}\oplus d_{22}\oplus d_{23}\oplus d_{24}$$

Similarly, data bits $d_{26}$, $d_{27}$ and $d_{28}$ may be added to $2t$ equations each of sets $S_2$, $S_3$, and $S_4$, respectively. Thus, e.g., $$c_6=d_0\oplus d_5\oplus d_{10}\oplus d_{20}\oplus d_{26}$$
$$c_{11}=d_0\oplus d_9\oplus d_{13}\oplus d_{17}\oplus d_{21}\oplus d_{27}$$
$$c_{16}=d_0\oplus d_8\oplus d_{19}\oplus d_{22}\oplus d_{28}.$$

Since each set can accept at most one data bit, $\phi=1$ for the $(m,2t)$ code (5,4).

Thus, there are now four check bit equations for each data bit $d_0$–$d_{24}$, of which one is from each set, and four check bit equations for each data bit $d_{25}$–$d_{28}$, of which each four are from the same set. Thus, referring to FIG. 5, the error correcting circuit for $d_0$ consists of four EXCLUSIVE OR-gates 30, 32, 34, 36 the inputs to which are derived from the equations for $c_1$, $c_6$, $c_{11}$, and $c_{16}$, respectively, and a majority voting circuit 38. Referring to FIG. 5*a*, the error correcting circuit for $d_{25}$ consists of four EXCLUSIVE OR-gates 40, 42, 44, 46, the inputs to which are derived from the equations for $c_1$, $c_2$, $c_3$, and $c_4$, respectively, and a majority voting circuit 48, which, like circuit 38, is a threshold logic circuit producing an output signal representative of the data bit if the majority of data bit and check bit inputs thereto are correct.

Thus, $k=29$ (which is a $k$ such that $(m^2<k<(m+1)^2)$ for which, under conventional Latin square procedure, there would have been required $2(m+1)t$ check bits, and, since $29<6^2$, $m+1$ would have been 6 and $r=2(m+1)t=24$. Yet, for the illustrated augmented code $r=20$ and $2mt=20<2(m+1)t$.

The "H-matrix" of the resultant code is shown in FIG. 6, where the "I-matrix" portion indicates check bits, the $S_1$–$S_4$ portion the sets of data bit equations, and the "B-matrix" portion the added data bits $d_{25}$–$d_{28}$.

In general, whenever $2t \leq m$, additional data bits can be added in the manner described. The following table illustrates augmentation of certain Latin square codes, together with the resultant $\phi$ values:

TABLE 1

| $m$ | $2t$ | $\phi$ |
|---|---|---|
| 3 | 4 | 0 |
| 4 | 4 | 1 |
| 4 | 6 | 0 |
| 5 | 4 | 1 |
| 5 | 6 | 0 |
| 6 | 4 | 1 |
| 6 | 6 | 1 |
| 7 | 4 | 2 |
| 7 | 6 | 1 |
| 8 | 4 | 2 |
| 8 | 6 | 1 |
| 8 | 8 | 1 |
| 9 | 4 | 3 |
| 9 | 6 | 1 |
| 9 | 8 | 1 |

In each case, the total number of data bits that can be added is $2t\phi$.

Where $2t>m$, there are insufficient (less than $2t$) independent locations available in each set of Latin square-derived equations to accept an additional data bit. However, in accordance with another embodiment of the invention, some check bits may be added, so long as the previously described conditions are met, viz: $2mt<r<2(m+1)t$, for any $k$ data bits. As an example of this embodiment, consider the square codes for $m=3$. Under conventional Latin square codes, a maximum of nine data bits can be corrected thereby, for $t=2$. Twelve check bits are required, and the resultant code may be written thus: (21, 9), where 21 is the total message length and 9 is the number of data bits in the message. It is possible to expand this code to (26, 13). One check bit has been added, bringing the total to 13, but this is still three less than would be required if it were necessary to go to the next highest Latin square ($m=4$, $r=16$).

FIG. 7 is the H-matrix of this new (26, 13) code. The original sets $S_1$–$S_4$ for the (21, 9) code each had only three independent equations, which is one less than the $2t$ number required for double error correction. Thus, $\phi$ would be less than 1, and it would appear no data bits could be added. However, if a single-check bit, $c_{13}$ is added, where $c_{13}=d_9\oplus d_{10}\oplus d_{11}\oplus d_{12}$, the fourth independent equation can be written for all four added data bits, thus allowing the (21, 9) code to be augmented to (26, 13).

Where $m$ is sufficiently large, it is possible to add more than one data bit to each original check bit equation, subject only to the limitation that there be left $2t$ independent equations per data bit. As a specific example of such augmentation, consider the expansion of a (117, 81) Latin square code, where $t=2$, $k$ (original) = 81, and $r=36$ to a code: (169, 129). A total of 48 data bits have been added while requiring the addition of only four check bits. Under conventional Latin square codes, for $k=129$, it would have been necessary to use $4m=48$ check bits, whereas, in accordance with present invention, 40 check bits are sufficient to correct double errors in that many data bits. The resultant matrices are shown in FIG. 8. The matrix $B_1$ is used to add data bits $d_{81}$–$d_{92}$; $B_2$ for $d_{93}$–$d_{104}$; etc. The data bits $d_{81}$–$d_{83}$, $d_{93}$–$d_{95}$, etc. are added to $S_1$.

Hence, considering the original data bit equations for $c_1$–$c_9$ ($S_1$), the augmented equations will be:

$$c_1=\ldots\oplus d_{81}\quad\oplus d_{93}\quad\oplus d_{107}\quad\oplus d_{118}$$
$$c_2=\ldots\oplus d_{81}\quad\oplus d_{94}\quad\oplus d_{105}\quad\oplus d_{119}$$
$$c_3=\ldots\oplus d_{81}\quad\oplus d_{95}\quad\oplus d_{106}\quad\oplus d_{117}$$
$$c_4=\ldots\oplus d_{82}\quad\oplus d_{93}\quad\oplus d_{107}\quad\oplus d_{118}$$
$$c_5=\ldots\oplus d_{82}\quad\oplus d_{94}\quad\oplus d_{105}\quad\oplus d_{119}$$
$$c_6=\ldots\oplus d_{82}\quad\oplus d_{95}\quad\oplus d_{106}\quad\oplus d_{117}$$
$$c_7=\ldots\oplus d_{83}\quad\oplus d_{93}\quad\oplus d_{107}\quad\oplus d_{118}$$
$$c_8=\ldots\oplus d_{83}\quad\oplus d_{94}\quad\oplus d_{105}\quad\oplus d_{119}$$
$$c_9=\ldots\oplus d_{83}\quad\oplus d_{95}\quad\oplus d_{106}\quad\oplus d_{117}$$

To provide a fourth independent equation for each added data bit, there is added, per set B of added data bits, one check bit, for a total of four check bits, $c_{37}$–$c_{40}$, each of which represents 12 data bits, and none of which have any data bits in common. Thus, $$c_{37}=d_{81}\oplus d_{82}\oplus d_{83}\oplus\ldots\oplus d_{92}$$
$$c_{38}=d_{93}\oplus d_{94}\oplus d_{95}\oplus\ldots\oplus d_{104}$$
$$c_{39}=d_{105}\oplus d_{106}\oplus d_{107}\oplus d_{116}$$
$$c_{40}=d_{117}\oplus d_{118}\oplus d_{119}\oplus\ldots\oplus d_{128}.$$

Thus, in general where $\phi$ is the integer portion of $m/(2t-1)$ it is possible to add up to $2\phi t$ data bits, per single added check bit, to a maximum of $2t$ added check bits. For example, where $t=2$, $\phi$ will equal 3 for $m=9$, 10, or 11. So a (117, 81) double error correction code may be expanded to, e.g.: (130, 93); (143, 105); (156, 117); and (169, 129), adding successively, $2t\phi$ data bits and one check bit, in addition to the (129, 93) expansion possible without the addition of check bits.

Other embodiments will occur to those skilled in the art and are within the following claims.

What is claimed is:

1. In a system for handling information in the form of messages of data bits, a multiple error correcting system for correcting $t$ where errors in messages of a number of data bits $k$, where $m^2<k<(m+1)^2$, and $m$ is an integer of at least 3, comprising encoding means including means for generating $r$ check bits where $2mt$ $r<2(m+1)t$, means for adding said $r$ check bits to said data bits, each check bit associated with a number of data bits, each data bit associated with $2t$ check bits, said $2t$ check bits having only said one data bit in common, means for transmitting said data bits and said check bits, decoding means including means for receiving said transmitted data bits and check bits, said received data bits and said check bits containing possible multiple errors, means for transmitting $2t+1$ data bits and check bits for each data bit, means for receiving said transmitted $2t+1$ check bits and data bits, said received check bits and data bits for each data bit being the data bit itself and $2t$ combinations of check bits and other data bits representing said data bit, and means for correcting bits in error in said received $2t+1$ check bits and data bits by producing output signals correctly corresponding to each of said data bits where no more than $t$ of said $2t+1$ received bits for that data bit are in error.

2. The system of claim 1 where said means for correcting bits in error comprises a threshold logic circuit for each of said data bits with said threshold fixed to produce an output signal of a value corresponding to that of the majority of inputs to said logic circuit.

3. The system of claim 1 wherein said means for receiving said data bits and check bits comprises $2t$ EXCLUSIVE OR circuits for each data bit each having inputs consisting of at least $m$, and, on the average, greater than $m$ data bits and one of said check bits.

4. The system of claim 1 wherein said encoding means includes circuitry for producing $2mt$ of said $r$ check bits in accordance with an arrangement of $m^2$ of said $k$ data bits, designated $d_0$, $d_1$....$d_{m^2-1}$, in a basic square array, where at least some data bits of $2m$ of said $r$ check bits are data bits of each row and each column of said square array, at least some data bits to which $2(m-1)$ of said check bits correspond are data bits which correspond in position in said basic square array of data to the position of digits which are the same in each of a pair of orthogonal squares for each $t$, and said encoding means further including circuit means for adding to said circuitry for producing said $2mt$ check bits a data bit of the group $k-m^2$ data bits, designated $d_{m^2}$....$d_{k-1}$, which augments at least $2t-1$ and at most $2t$ of said $2mt$ check bits and all of said augmented check bits having only said added data bit in common.

5. The system of claim 4 wherein $r>2mt$, and said encoding means includes further circuitry for producing $r-2mt$ check bits, all of which correspond only to data bits $d_{m^2}$....$d_{k-1}$.

* * * * *

PO-1050
(5/69)

UNITED STATES PATENT OFFICE
CERTIFICATE OF CORRECTION

Patent No. 3,634,821 Dated January 11, 1972

Inventor(s) Douglas C. Bossen, M. Y. Hsiao

It is certified that error appears in the above-identified patent and that said Letters Patent are hereby corrected as shown below:

In the Abstract:

line 2, the first formula should read --($t \geq 2$)--;
line 2, the word "message" should read --messages--;
line 2, the second formula should read --$m^2 \leq k < (m+1)^2$--;

line 8, the formula should read --$2mt \leq r < 2(m+1)t$--;

In The Specification:

Column 1, line 72, the first formula should read --$t \geq 2$,--;

In the Claims:

Column 7, line 3, after the word "where", the formula --$t \geq 2$-- should be inserted;

Column 7, line 7, the formula should read --$2mt \leq r < 2(m+1)t$--.

Signed and sealed this 13th day of June 1972.

(SEAL)
Attest:

EDWARD M.FLETCHER, JR.
Attesting Officer

ROBERT GOTTSCHALK
Commissioner of Patents 623-2721-0